United States Patent

[11] 3,614,437

| [72] | Inventors | Robert Allemand<br>Grenoble;<br>Jean Jacobe, Montbonnot; Edouard<br>Roudaut, Grenoble, all of France |
|---|---|---|
| [21] | Appl. No. | 816,339 |
| [22] | Filed | Apr. 15, 1969 |
| [45] | Patented | Oct. 19, 1971 |
| [73] | Assignee | Commissariat A L'Energie Atomique<br>Paris, France |
| [32] | Priority | Apr. 18, 1968 |
| [33] | | France |
| [31] | | 148,589 |

[54] NEUTRON DETECTION DEVICE FOR THE POSITION OF BEAMS OF NEUTRONS IN SPACE
8 Claims, 5 Drawing Figs.

[52] U.S. Cl. .................................................. 250/83.1,
250/83.6, 313/61, 313/93
[51] Int. Cl. ........................................................ G01t 3/00,
G01t 1/18
[50] Field of Search ............................................. 250/83.1,
83.6; 313/61, 93

[56] References Cited
UNITED STATES PATENTS

| 2,531,144 | 11/1950 | Manley | 250/83.6 |
| 2,566,089 | 8/1951 | Linder | 250/83.6 |
| 2,604,600 | 7/1952 | Neufeld | 250/83.1 |
| 3,029,343 | 4/1962 | Reiffel et al. | 250/83.1 |

Primary Examiner—Archie R. Borchelt
Attorney—Cameron, Kerkam & Sutton

ABSTRACT: A neutron detection device comprises a single gas-filled flat enclosure of constant thickness. A number $N \times n$ of identical disintegration ionization chambers are disposed at regular intervals in the enclosure and a cathode and an anode are carried by opposite walls. Responsive to a detection, two electrical pulses are delivered by the two electrodes of a cell and one is addressed to one of the $n$ lines and the other to one of the $N$ columns of a matrix-type network comprising $N \times n$ counters each associated by a line and a column of the network with only one of the cells.

NEUTRON DETECTION DEVICE FOR THE POSITION OF BEAMS OF NEUTRONS IN SPACE

The present invention relates to a neutron detector device intended to localize the position of beams of neutrons in space. An important use of this device resides in angularly localizing and measuring the intensity of beams of thermal neutrons diffracted by a sample for analysis which is irradiated by a pencil of thermal neutrons.

The angular position and intensity of these beams has hitherto been determined by scanning the space round the sample by means of a proportional counter, generally of the boron trifluoride type, disposed on the arm of a goniometer centered on the sample.

This method is long and exhibits numerous disadvantages. Because measurements are not simultaneous, and the incident pencil of neutrons is nonuniform in time, the intensity of the said pencil is not absolutely the same for all measurements. In order to overcome this, it is necessary to introduce a correction based on measurement of the incident beam, and this complicates the apparatus. The latter is in practice applicable only to the investigation of powders, since in this case it is sufficient to scan the meridian plane in order to determine the crystalline parameters. Only the meridian plane is then scanned point by point by measuring the intensity of the beam detected for each of the successive angular positions imparted to the arm of the goniometer. However, the investigation of crystals requires scanning both in azimuth and in elevation, which makes the investigation take a prohibitively long time.

The present invention deals with the embodiment of a neutron detector device which more particularly makes it possible to determine the spatial distribution of beams of neutrons emitted by a localized source, and which complies better than those heretofore proposed with practical requirements, more particularly in that it supplies simultaneous information on the whole of the space under examination.

For this purpose, the invention proposes a device comprising, in a single enclosure of constant thickness containing a gas: a number N×n of identical detector cells disposed at regular intervals, and each comprising at least two electrodes; means for taking off and amplifying two electrical pulses at two different electrodes of each of the cells, one being addressed to one of the $n$ lines and the other to one of the N columns of a matrix-type network comprising N×n counters each associated by a line and a column of the network with only one of the cells; and means for applying between the electrodes a potential difference such that each cell operates as an ionization chamber of the disintegration type acting by direct collection of the charges.

As opposed to proportional counter tubes, direct collection ionization chambers allow for widely varying layouts and for the filler atmosphere to be at high pressure, thus giving increased sensitivity for a given volume. In addition, the operating voltage is low (less than 1,000 V.) and need not be stabilized. The reduction in the number of charges picked up on each pulse as compared to proportional counter tubes (in which the charges are multiplied by a coefficient which may be as much as 500) is compensated for by the use of charge preamplifiers having a high gain and a low noise level. However, cells of this type can only be used for detecting particles which give rise to a sufficient quantity of charges (greater than about $10^{-15}$ coulombs) in the atmosphere of the chamber, which is the general case for neutrons acting on a suitable atmosphere: for thermal neutrons, the quantity of charges which can be picked up for each nuclear event is about $10^{-14}$ coulombs with $BF_3$ and $4 \times 10^{-15}$ coulombs with $^3He$.

The advantage of matrix-type distribution which has just been defined is clear: while in the case of measurement paths each associated with one cell the paths are equal in number to the cells, i.e. N×n for example, it is not more than N+n in the case of the invention: for a mosaic of 10,000 cells, there would be only 200 measurement paths using a square matrix.

The invention will be better understood by reading the following description of some forms of embodiment which are given by way of nonlimitative examples, which description refers to the accompanying drawings, wherein.

Figure 1:
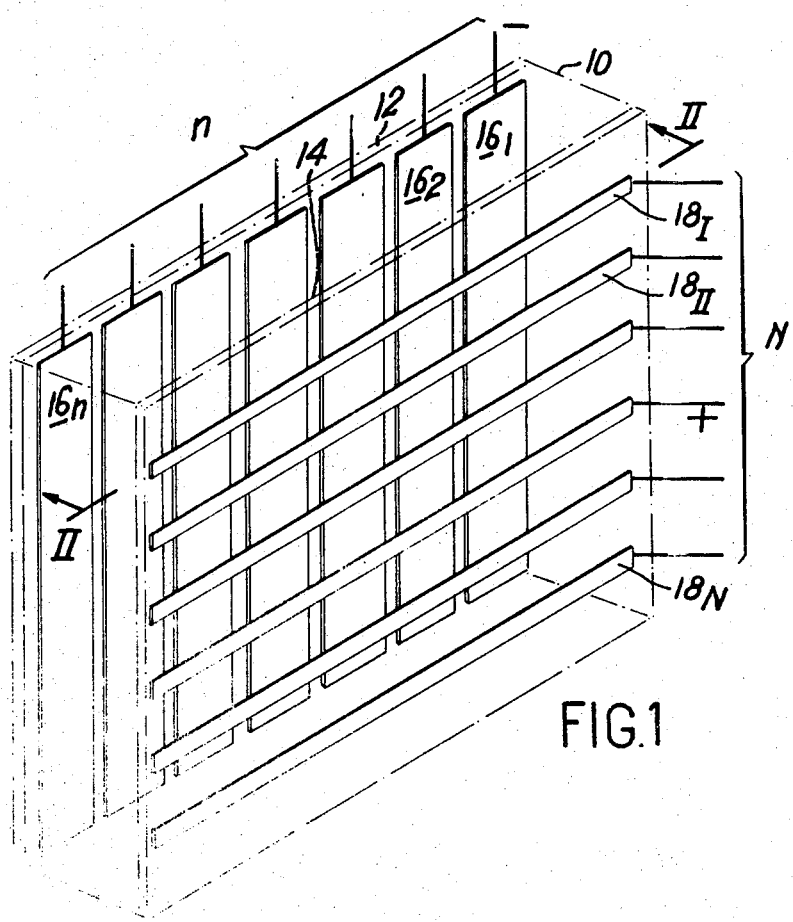
FIG. 1 shows in diagrammatic perspective the detector in a form of embodiment intended to localize in azimuth and elevation beams of thermal neutrons originating from a source which is substantially a point.
Figure 4:
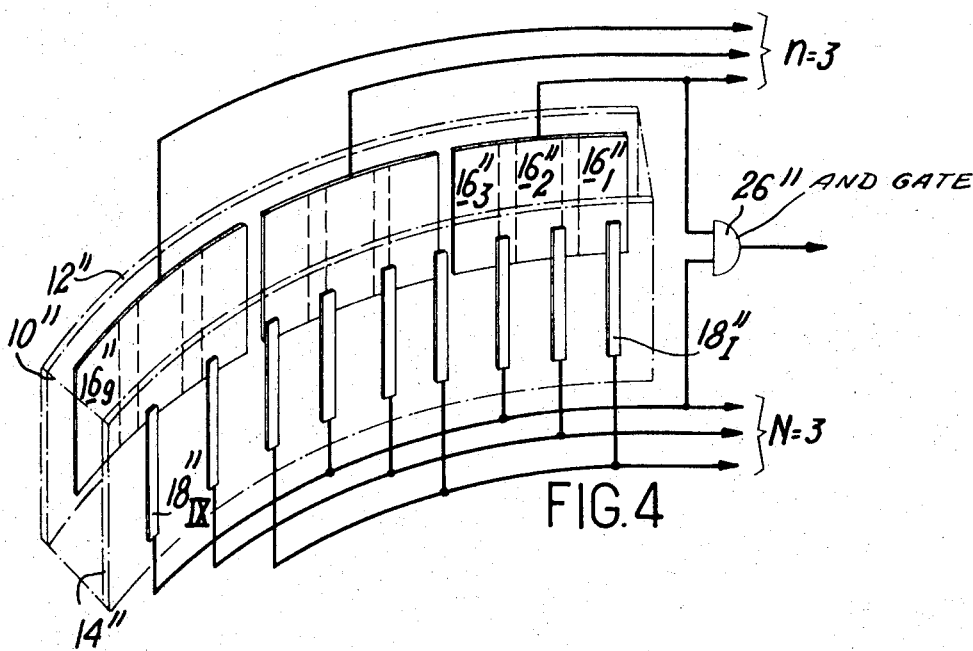
Figure 5:
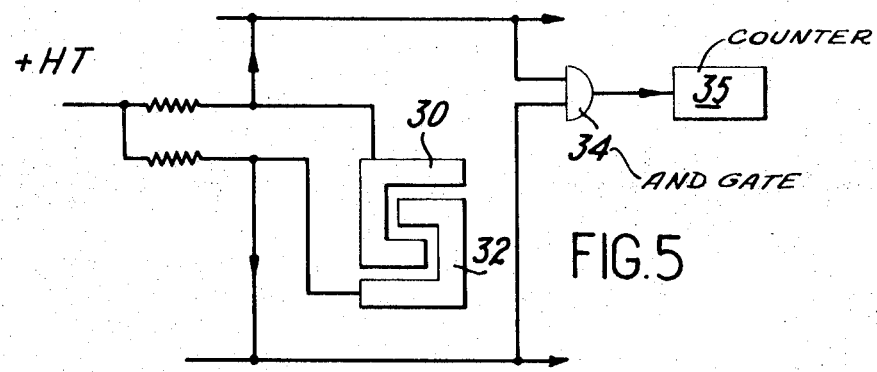

FIG. 4, which is similar to FIG. 1, shows a beam-localizing detector in a plane of symmetry, which may, for example, be an azimuthal plane;

FIG. 5 is a detail view showing the anode of a cell belonging to a detector according to another variant of use of the invention and the associated fraction of the matrix-type localizing network.

Figure 2:
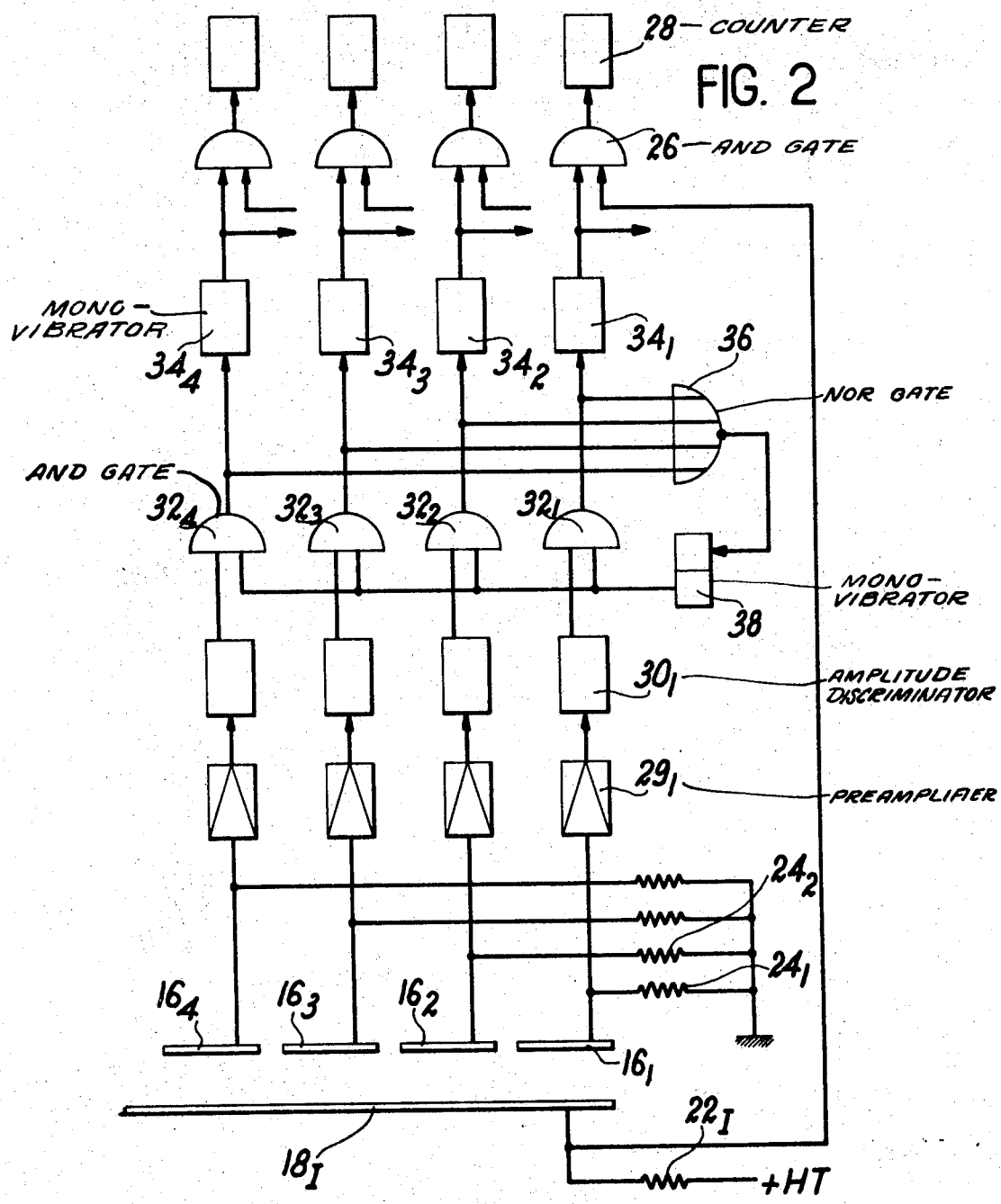
FIG. 2 is a diagram showing a fraction of the matrix-type localization network and of the load circuits associated with the detector of FIG. 1.

The device illustrated in FIGS. 1 and 2 is intended to determine the angular position in azimuth and in elevation and the intensity of beams of thermal neutrons diffracted by a crystal to be analyzed: it is known that the investigation of diffraction by a crystal subjected to a pencil of neutrons requires the diffracted beams to be scanned in a large solid angle, and not only (as is the case for powders) in a single azimuthal plane.

It should, however, be remembered that the device illustrated in FIGS. 1 and 2 could also be used to make a neutron map of a sample having dimensions of the same order as the plan area of the detector, provided that a suitable collimator, in the form for example of a plate of neutron-absorbing material drilled with suitably orientated orifices, were interposed between the detector and the sample.

The device comprises a detector (FIG. 1) in the form of a thin fluidtight enclosure 10 made of a material of small neutron-capture cross section, such as a light alloy. In the form of embodiment illustrated, this enclosure, which is illustrated in mixed line, is plane: the best shape which it can have in order to investigate radiation from a point is that of a spherical cup, but that is difficult to make. On the contrary, the enclosure may be bent to form part of a cylinder; this shape, which is relatively simple to make, eliminates the need to make corrections to the information, either in azimuth or in elevation.

The enclosure 10, which is a few millimeters thick, contains an atmosphere whereof one of the components is capable of disintegrating and at the same time yielding ionizing particles by interaction with a neutron (boron trifluoride or helium 3). In order to limit the length of the path of these particles, the atmosphere is advantageously at a pressure of a few bars, and comprises a gas of high retarding power (krypton for example).

The enclosure 10 contains a number N×n of detector cells ($n$ being advantageously equal to N). Each of these cells comprises a cathode carried by an internal insulating coating 12 which covers or constitutes one of the walls of large surface area (walls facing the source) and an anode carried by an insulating coating 14 which internally covers the opposite face. In the form of embodiment illustrated in FIG. 1, the cathodes of N cells disposed in the same column are made up of one and the same metal strip disposed on the insulating support 12 (all the metal strips $16_1, 16_2, ... 16_n$ forming the cathodes being parallel to one another and separated by equal intervals). The anodes of all the cells grouped in the same line are likewise formed by a metal strip on the opposite insulating support, the strip $18_I, 18_{II}, ... 18_N$ constituting the anodes being disposed perpendicularly to those forming the cathodes. The detection zone of each cell consists of the space filled with gas disposed on a level with the intersection of an anode strip and a cathode strip.

A steady high voltage which is so chosen that the cells operate under direct charge collection conditions is applied to each of the strips forming the anodes, for example to the strip $18_1$ (FIG. 2) via a resistance 22; similarly, each of the strips $16_1$, $16_2$ ... forming the cathodes is connected to earth via a resistance $24_1$, $24_2$ ... The strips $16_1$, $16_2$, ... $16_n$ may be applied in very simple fashion starting from printed-circuit boards.

The detector illustrated in FIG. 1 makes it possible to pick up items of information originating from:

—on the one hand, charges induced on the anodes by displacement of electrons towards the latter, —on the other hand, charges set up by action on the corresponding cathodes as a result of electrons being displaced towards the anode.

The items of information supplied by the pulses resulting from a neutron being detected by a cell may be acquired by various processes: the circuit illustrated in FIG. 2 comprises a forward coincidence circuit 26 (AND gate) associated with each line-column pair: each counter 28 fed by an AND circuit (after amplification and after amplitude selection) records a number of pulses representing the number of neutrons detected by the cell. Other solutions are clearly possible.

As has been indicated above, interaction between neighboring cells is reduced by shortening the path of particles originating from disintegration of the nuclei of a gas of the atmosphere in the enclosure. However, this measure does not entirely eliminate interaction, since any event influences a plurality of adjacent cells, whatever the length of the ionization path. In order to mitigate the consequences of this phenomenon, amplitude discrimination is carried out between two consecutive electrodes in the same line or in the same column, which makes it possible not to lose any items of information.

In addition, two nuclear events may follow one another in a time interval shorter than the resolution time of the AND-circuits 26, so that these circuits would cause four items of information to appear. The device illustrated in FIG. 2 comprises inhibiting circuits intended to eliminate this cause of error, and also amplitude discriminators in order to reduce the recording of the same event by a plurality of adjacent cells.

For the sake of greater simplicity, only the inhibiting circuits associated with four strips $16_1$, $16_2$, $16_3$ and $16_4$ are illustrated in FIG. 2. A pulse originating from the strip $16_1$ is applied, after amplification by a preamplifier $29_1$, to an amplitude discriminator $30_1$ whereof the window is chosen as a function of the energy of the radiation to be detected. The output of the discriminator $30_1$ drives one of the inputs of an AND-circuit $32_1$ whereof the output controls a monostable device $34_1$. It is the output of this monostable device which is applied to the input AND-circuits 26 of the counters or counting rate meters associated with the strip $16_1$. The outputs of all the AND-circuits $32_1$, $32_2$, ... are also connected to a NOR-circuit 36 which switches over a monostable device 38 whereof the output is applied to the second input of each of the AND-circuits $32_1$, $32_2$, $32_3$ ... It will thus be seen that, when a pulse appears on one of the strips $16_1$, $16_2$, the output of the corresponding AND-circuit $32_1$, $32_2$ acts via the NOR circuit 36 to trip the monostable device 38, which cuts off all the AND-circuits 32 for a suitable time interval (2 microseconds for example). This inhibition of all the transfer paths to the counters after a pulse has appeared on one of them takes place at the end of about 20 nanoseconds when conventional integrated circuits are used: the risk of false information is therefore limited to the very slight probability that two paths will receive two items of information during a time interval of less than 20 nanoseconds. The monostable devices 34, $34_1$, $34_2$, $34_3$, ... make it possible to maintain on the AND circuits such as 26 a pulse of sufficient length to ensure that coincidence occurs and that the pulse is recorded by the corresponding counter 28.

The inventors have found experimentally that interaction between cathodes is much greater than interaction between anodes: this fact has resulted in the strips $18_I$, $18_{II}$, ... $18_N$ forming the anodes being made appreciably narrower than the interval which separates them (FIG. 1), and on the contrary in the cathode strips being made of such a width that only a relatively small interval remains between two successive strips, $16_1$ and $16_2$ for example.

Interaction between cathodes may be further reduced by placing electrostatic screens between the strips $16_1$, $16_2$ ... The same result may be attained by using the arrangement diagrammatically illustrated in FIG. 3, in which each cathode strip is of U-shaped cross section. For the sake of greater clarity, the elements illustrated in FIG. 3 and FIG. 1 bear the same reference numbers, with the addition of the prime index in FIG. 3.

By way of example, it may be indicated that a detector comprising 25 cells has been made, using an enclosure 8 mm. thick between electrodes. The cells were arranged in the form of a square network of 8-mm. pitch. Two successive cathode strips were separated by 1 mm., while the anode strips were separated by 7 mm. and were 1 mm. wide.

A device for detecting thermal neutrons of the type illustrated in FIGS. 1 and 2 has also been made with 2,500 cells ($n$=50 and $N$=50) distributed at the intersections of a square network having a pitch of 10 mm.; the distance between anode and cathode was 12 mm., and the enclosure was filled with boron tetrafluoride $BF^3$, helium 3 or boron trichloride $B Cl^3$ at atmospheric pressure. The DC voltage between anode and cathode was 600 v. for BF3 at a pressure of 1 atmosphere, and 1,200 v. for BF3 at a pressure of 20 atmospheres. The use of $^3He$ at a pressure of a few atmospheres would lead to a high voltage of 1,000 V. to 2,000 V.

Figure 3:
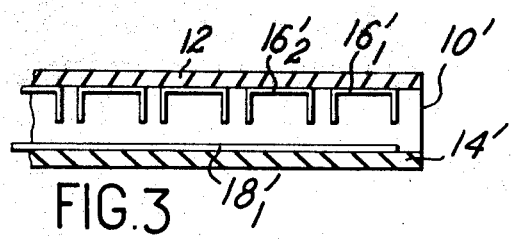
FIG. 3 is a detail view of a detector according to a modified embodiment in section, in a plane parallel to the anodes.

Detectors of the types shown in FIGS. 1 and 3 enable the distribution in space of neutron beams to be determined: when it is sufficient to scan a meridian plane, it is possible to adopt the arrangement illustrated in FIG. 4, in which elements corresponding to those already illustrated in FIG. 1 bear the same reference number with the addition of the second order index.

The device of FIG. 4 comprises an enclosure 10″ bent into an arc of a circle, and intended to be so placed that its median plane coincides with the azimuthal plane to be investigated. The opposite cylindrical walls are covered with insulating coatings 12″ and 14″ which carry the cathodes and the anodes respectively. The device illustrated comprises nine aligned cells, each made up of one cathode and one anode disposed parallel to one another. Since N consecutive cathodes are interconnected and connected to one of the $n$ columns, N consecutive cathodes corresponding to a same column of the matrix take the form of a single cathode plate: for example the three cathodes $16_1″$, $16_2″$ and $16_3″$ (in dashed line) are made up by one and the same plate indicated in full line. As a result there are only $n$ independent cathode plates as shown in FIG. 4. This arrangement offers the advantage that the cathodes have an increased yield, and consequently that there is a signal of greater amplitude. With this arrangement, there is less interaction between neighboring cells than when the anodes and cathodes take the form of mutually perpendicular strips.

An electronic circuit analogous to that of FIG. 2 disposed on the conductors coming from the anodes and cathodes eliminates items of information appearing almost coincidentally on two neighboring anodes. For the sake of greater simplicity, only one AND-circuit 26″ corresponding to the coincidence circuit 26 of FIG. 2 has been indicated.

A device of the type illustrated in FIG. 4 has been made with 200 cells distributed with a pitch of 5 mm. on a cylinder with a radius of 1,500 mm., corresponding to an angular definition of 12′. The distance between anode and cathode was 15 mm. and the atmosphere consisted of $BF_3$ at a pressure of 1.5 bar.

The efficiency for neutrons of $\lambda$=1 A. was 20 percent, and its variation from cell to cell (due to geometrical tolerances) remained less than 5 percent.

Advantage may be taken of the fact that interaction between anodes is low, while interaction between cathodes cannot be neglected: in this connection, it is sufficient to adopt an arrangement which uses only signals originating from anodes in order to localize the excited cell. Since two items of information per cell are necessary, each anode is made up of two half-anodes, the two half-anodes 30 and 32 being overlapped one into the other so that the phenomena of producing a signal are substantially the same for the two half-anodes of the same cell. The half-anodes may then be taken to the high voltage by way of separate high-resistance circuits as shown by FIG. 5. The cathode may then be reduced to a simple earthed plane (not illustrated) occupying the whole of the one of the plane surfaces of the enclosure. One of the half-anodes, 30 for example, feeds one column, while the other half-anode 32 feeds one line. The AND circuits such as 34 remain arranged between lines and columns by way of circuits similar to those of FIG. 2 (not illustrated) and feed the associated counters 35.

It will be seen that, as indicated above, the invention makes it possible to scan simultaneously the whole of the space under investigation or of a meridian plane, thus giving a substantial reduction in experimental time.

What we claim is:

1. Neutron detector device comprising, in a single enclosure of constant thickness containing a gas: a number $N \times n$ of identical detector cells disposed at regular intervals, N being a predetermined whole number greater than one and $n$ being a predetermined whole number greater than one and each comprising at least two parallel flat electrodes; $N \times n$ counting means each arranged to count pulses from a respective one of the $N \times n$ detector cells, the detector cells and counting means being interconnected via N first communication paths, each connecting a respective group of $n$ counting means to the electrodes of a corresponding group of $n$ detector cells and via $n$ second communication paths each connecting a respective group of N counting means to the second electrodes of a corresponding group of N detector cells; and means for applying between the electrodes of each detector cell a potential difference such that each cell operates as an ionization chamber of the disintegration type acting by direct collection of the charges.

2. Device according to claim 1, wherein the cells are distributed in accordance with a rectangular or square array of $n$ lines and N columns and each comprises an anode and a cathode disposed face-to-face, the pulses appearing at the cathodes of N aligned cells being fed to the same line of the matrix, and the pulses appearing at the anodes of $n$ cells aligned in a direction perpendicular to the foregoing being fed to the same column of the matrix.

3. Device according to claim 2, wherein the cathodes of N aligned cells are formed by the same metal strip, and the anodes of $n$ aligned cells are formed by the same metal strip, said strips being perpendicular.

4. Device according to claim 3, wherein the interval between two adjacent strips of cathodes is less than the interval between two adjacent strips of anodes.

5. Device according to claim 1 for determining the azimuthal distribution of a flux of neutrons emitted by a source comprising $N \times n$ aligned cells, and a matrix of $n$ lines and N columns wherein the pulses appearing at $n$ successive cathodes are fed to the same column of the matrix, and the pulses appearing at N anodes are fed to the same line.

6. Device according to claim 5, the $n$ successive cathodes connected to the same column being formed by the same conductive plate.

7. Device according to claim 1, wherein each cell comprises a cathode and two overlapping half-anodes of the same surface area connected to identical bias potentials with respect to the cathode, the electrical detection pulses being taken from said half-anodes.

8. Neutron detector device comprising, in a single enclosure of constant thickness containing a gas: a number $N \times n$ of identical detector cells disposed at regular intervals, N being a predetermined whole number greater than one and $n$ being a predetermined whole number greater than one and each comprising at least two electrodes; $N \times n$ counting means each arranged to count pulses from a respective one of the $N \times n$ detector cells, the detector cells and counting means being interconnected via N first communication paths, each connecting a respective group of $n$ counting means to the electrodes of a corresponding group of $n$ detector cells and via $n$ second communication paths each connecting a respective group of N counting means to the second electrodes of a corresponding group of N detector cells; and means for applying between the electrodes of each detector cell a potential difference such that each cell operates as an ionization chamber of the disintegration type acting by direct collection of the charges, an inhibiting circuit associated with each transmission path of an electrical detection pulse from a cell electrode, which circuit comprises a series arrangement of a first AND circuit and a monostable device which feeds one of the inputs of an input coincidence circuit of the counter associated with the said cell, the monostable device holding for long enough to control the counter, and moreover comprising a NOR circuit whereof the inputs are fed by the AND circuits of a plurality of adjacent paths associated with electrodes of the same type, the output of the NOR circuit being applied to a second monostable device which feeds the second input of the AND circuits of the said paths for the purpose of inhibiting these circuits for a predetermined time interval after a signal has appeared on one of the paths.